United States Patent
Smith

(10) Patent No.: US 7,331,308 B1
(45) Date of Patent: Feb. 19, 2008

(54) COLLAPSIBLE GAME FEEDER

(75) Inventor: Craig Smith, Argyle, TX (US)

(73) Assignee: Dynamic Color Images, Inc., Carrollton, TX (US)

( * ) Notice: Subject to any disclaimer, the term of this patent is extended or adjusted under 35 U.S.C. 154(b) by 0 days.

(21) Appl. No.: 11/120,754

(22) Filed: May 2, 2005

Related U.S. Application Data

(60) Provisional application No. 60/567,403, filed on Apr. 30, 2004.

(51) Int. Cl.
*A01K 5/00* (2006.01)

(52) U.S. Cl. .................. 119/57.91; 119/57.92

(58) Field of Classification Search ............. 119/51.01, 119/65, 66, 67, 68, 69, 57.92, 57.91; 383/67, 383/66, 36, 6, 13, 24, 97
See application file for complete search history.

(56) References Cited

U.S. PATENT DOCUMENTS

| | | | |
|---|---|---|---|
| 31,952 A | 4/1861 | Cahoon | |
| 41,321 A | 1/1864 | Rogers | |
| 275,590 A | 4/1883 | Clark | |
| 277,861 A | 5/1883 | Yoder et al. | |
| 315,405 A | 4/1885 | Gore | |
| 363,053 A | 5/1887 | Easterling | |
| 420,450 A | 2/1890 | Hamilton et al. | |
| 649,953 A | 5/1900 | Rinderknecht | |
| 935,734 A | 10/1909 | Bessen | |
| 4,143,796 A * | 3/1979 | Williamson et al. | ..... 222/181.3 |
| 4,390,051 A * | 6/1983 | Cuthbertson | ................. 383/111 |
| 4,518,106 A * | 5/1985 | LaFleur | ....................... 222/460 |
| 4,759,473 A * | 7/1988 | Derby et al. | ................. 222/105 |
| 5,810,166 A * | 9/1998 | Weinreb | .................. 206/316.2 |
| 6,050,222 A | 4/2000 | Bean | ........................... 119/65 |
| 6,092,574 A * | 7/2000 | Krulik | ......................... 150/110 |
| 6,886,981 B2 * | 5/2005 | Taniguchi et al. | ............ 383/67 |

OTHER PUBLICATIONS

SpinPro "*Mounting Feeder to Feed Container*" internet website article located at http://spinpro.from-the.net/mount.phtm, dated Apr. 21, 2004, 2 pages.
SpinPro "*How the Feeder Works*" internet website article located at http://spinpro.from-the.net/how.phtm, dated Apr. 21, 2004, 1 page.
Speciality Systems, Inc. "*SSI Automatic Wildlife Feeder for Deer, Game, Fish and Livestock*" internet website article located at http://Instar.com/ssi/, dated Apr. 21, 2004, 1 page.

(Continued)

*Primary Examiner*—T. Nguyen
(74) *Attorney, Agent, or Firm*—Robert J. Ward; Gardere Wynne Sewell

(57) ABSTRACT

An exemplary collapsible game feeder and method are provided. In one embodiment, the collapsible game feeder includes a collapsible container and a dispensing device. The collapsible container may receive and store feed and release feed to the dispensing device for dispensing external the collapsible game feeder. In another aspect of the invention, a method for transporting and using a collapsible game feeder. The method includes providing a collapsible game feeder, transporting the collapsible game feeder to a desired location in the collapsed state, filling the collapsible game feeder with feed, and using the collapsible game feeder by having it dispense feed. The present invention also encompasses other embodiments and methods.

17 Claims, 7 Drawing Sheets

OTHER PUBLICATIONS

SpinPro "*See More Wildlife, Try a Wildlife Feeder by Spinpro*" internet website article located at http://spinpro.from-the.net/seemore.phtm, dated Apr. 21, 2004, 2 pages.

SpinPro "*Replacement Parts and Installation*" internet website article located at http://spinpro.from-the.net/parts.phtm, dated Apr. 21, 2004, 2 pages.

SpinPro "*Feeders, Accessories and Spare Parts Catalog*" internet website article located at http://spinpro.from-the.net/accessories.phtm., dated Apr. 21, 2004, 5 pages.

\* cited by examiner

COLLAPSIBLE GAME FEEDER

CROSS-REFERENCE TO RELATED APPLICATIONS

Pursuant to 35 U.S.C. § 119(e), this application claims the benefit of and hereby incorporates by reference for all purposes U.S. Provisional Patent Application Ser. No. 60/567,403 entitled Collapsible Game Feeder, naming Craig A. Smith as inventor, filed Apr. 30, 2004.

TECHNICAL FIELD OF THE INVENTION

The present invention relates generally to the field of game feeders and more particularly, but not by way of limitation, to a collapsible game feeder.

BACKGROUND OF THE INVENTION

Game feeders are known in the art (e.g., by hunters) as a mechanism that can be utilized to disperse feed (e.g., seed or corn) in attempts to attract game (e.g., deer and the like). FIG. 1 is a prior art game feeder 200, exemplary of several current existing game feeders. These game feeders (e.g., game feeder 200) typically include a metallic drum 202 and a dispensing device 210 hanging therefrom. The metallic drum 202 holds the feed while the dispensing device 210 is operable to disperse the feed. The general operation of such a device is as follows: the metallic drum 202 contains a hole in its lowermost end in which a feeder funnel 204 is disposed. Feed is gravity fed through the feeder funnel 204 and comes in contact with a spinner plate 206. When the spinner plate 206 is at rest, the feed clogs—preventing feed from falling through the feeder funnel 204. When the spinner plate 206 begins to spin, feed is launched from the spinner plate 206 and feed begins to flow through the feeder funnel 204, replacing the launched feed.

These metallic drums 202 are typically positioned on a support device such as a tripod. The support brackets 208 allow suspension of the dispensing device 210.

While these game feeders 200 have been advantageously used to disperse feed and attract game, they are not easily stored and/or transported. They are bulky and extremely inconvenient, especially when attempting to transport over hostile terrain, such as heavily wooded areas. For example, a store, warehouse, or garage needs a large area to store the metallic drums 202. Such a requirement for a large area can become a problem in settings (e.g., in a store) where storage space or shelf spacing is limited and valuable. Additionally, transportation of game feeders 200 from one location to another becomes awkward and expensive (e.g., in commercial settings). Furthermore, there is no easy way for an individual to transport a filled or unfilled game feeder 200 to an ultimate installation location.

In addition to the above, such game feeders 200 typically do not handle environmental elements and/or nuisance animals (that is, animals that are unintentionally attracted to the feed) well. With regards to the former, environmental elements such as rain, snow, or even dirt tend to settle upon the flat uppermost end of the metallic drum 202. Such a settling of environmental elements can cause an undesirable weight load on the metallic drum 202; and, in some instances, the environmental elements can cause the metallic drum 202 to rust. With regards to the latter, nuisance animals (such as squirrels) can easily jump on the flat uppermost end of the game feeder 200 in attempts to undesirably access the feed in the metallic drum 202.

SUMMARY OF THE INVENTION

From the foregoing it may be appreciated that a need has arisen for a collapsible game feeder. In accordance with the present invention, a collapsible game feeder is provided that substantially eliminates one or more of the disadvantages and problems outlined above.

According to an exemplary aspect of the present invention, a game feeder has been provided, which comprises a container and a dispensing device. The container includes a body, a top end, a bottom end, an access area, straps, and a loop. The dispensing device includes a bottom plate, a spinner plate, a feeder funnel, and support brackets. The access area includes a zipper, a flap, and zipper threads. The container can transition between an expanded state and a collapsed state and the dispensing device can disperse feed.

The various embodiments and implementations of the present invention may provide a profusion of potential technical advantages and benefits. A technical advantage of the present invention may include the capability to save space.

Another technical advantage of the present invention may include the capability to facilitate transportation of a game feeder, while empty or full with feed.

Another technical advantage of the present invention may include the capability to reduce negative effects of nuisance animals.

Another technical advantage of the present invention may include the capability to facilitate transportation of a filled game feeder through wooded or harsh terrain.

Another technical advantage of the present invention may include the capability to facilitate the collapsibility of a game feeder.

Yet another technical advantage of the present invention may include the capability to maximize shelf spacing in retail stores.

Still yet another technical advantage of the present invention may include the capability to reduce negative effects of environmental elements.

Other technical advantages may be readily apparent to one skilled in the art after review of the following figures and description associated herewith.

BRIEF DESCRIPTION OF THE DRAWINGS

For a more complete understanding of the present invention and the advantages thereof, reference is now made to the following brief description, taken in connection with the accompanying drawings and detailed description, wherein like reference numerals represent like parts, in which.

DETAILED DESCRIPTION OF THE INVENTION

It should be understood at the outset that although an exemplary implementation of the present invention is illustrated below, the present invention may be implemented using any number of techniques, whether currently known or in existence. The present invention should in no way be limited to the exemplary implementations, drawings, and techniques illustrated below, including the exemplary design and implementations illustrated and described herein. Additionally, the drawings contained herein are not necessarily drawn to scale.

Figure 1:
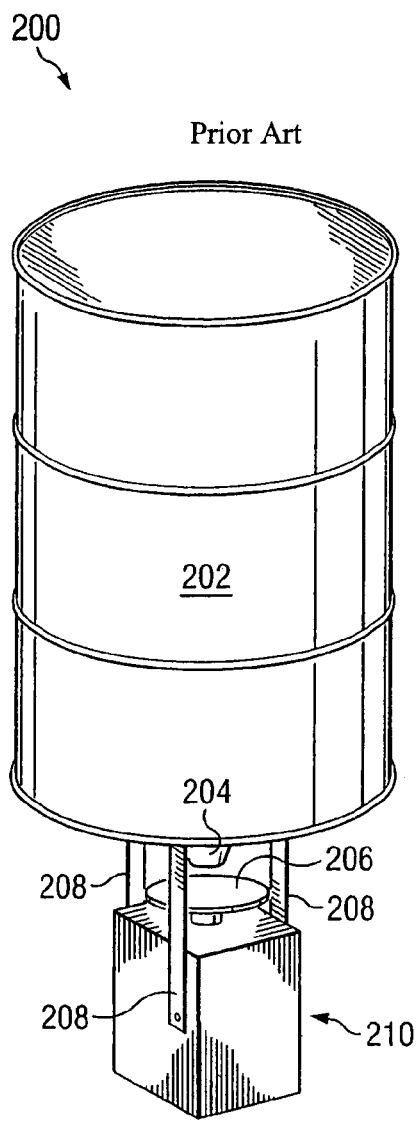
FIG. 1 is a front perspective view of an exemplary design of an existing game feeder.
Figure 2:
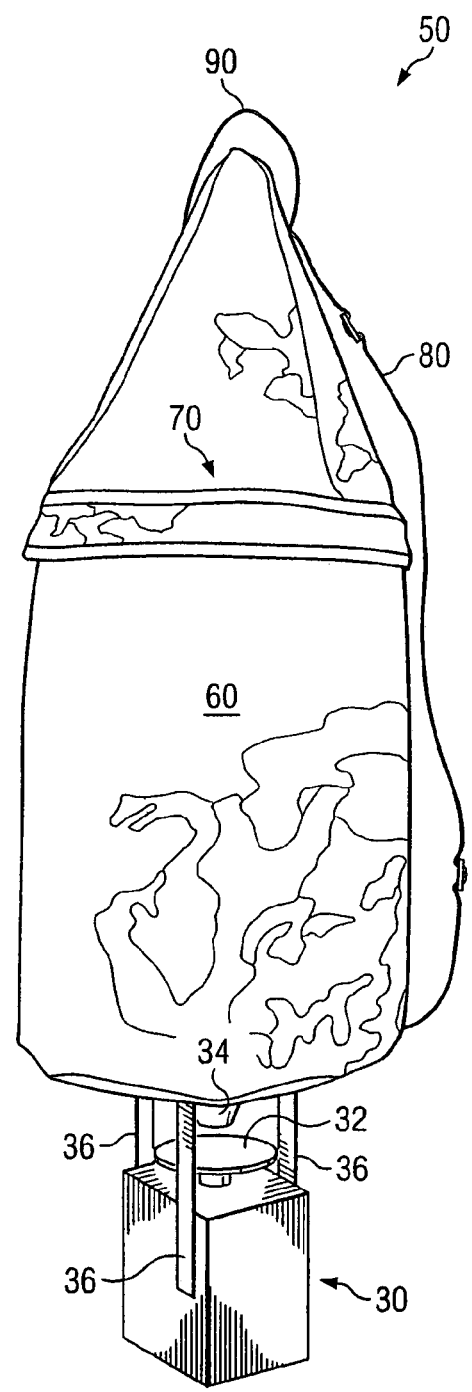
FIG. 2 is a front perspective view of a game feeder, according to an exemplary configuration of the invention.

FIG. 2 generally shows a front perspective view of a game feeder 50, according to an exemplary configuration of the invention. In the configuration of FIG. 2, the game feeder 50 includes a container 60, which is shown with a camouflage pattern, and a dispensing device 30. The container 60 includes straps 80, a loop 90, and an access area 70—the details of which will be described in more detail below. The dispensing device 30 can be a broadcast feeder/spreader having characteristics similar to the dispensing device 210 of FIG. 1. For example, the dispensing device 30 can have a spinner plate 32, feeder funnel 34 (which does not have to be considered part of the dispensing device 30, but may be considered part of the container 60), and support brackets 36. Additionally, the dispensing device 30 can include a variety of other component parts, including, but not limited to, automatic timers for automatic feeding, electric eyes, motion sensors, light detectors, battery compartments, cameras, solar panels, motors, and other component parts that will become apparent to one of ordinary skill in the art. The illustration of the dispensing device 30 in FIG. 2 is only intended to show one configuration of a dispensing device 30 that can be utilized in the game feeder 50. Therefore, it should be expressly understood that virtually any dispensing device can be utilized with the game feeder 50—including all dispensing devices currently known and dispensing devices that will later be developed.

Figure 3:
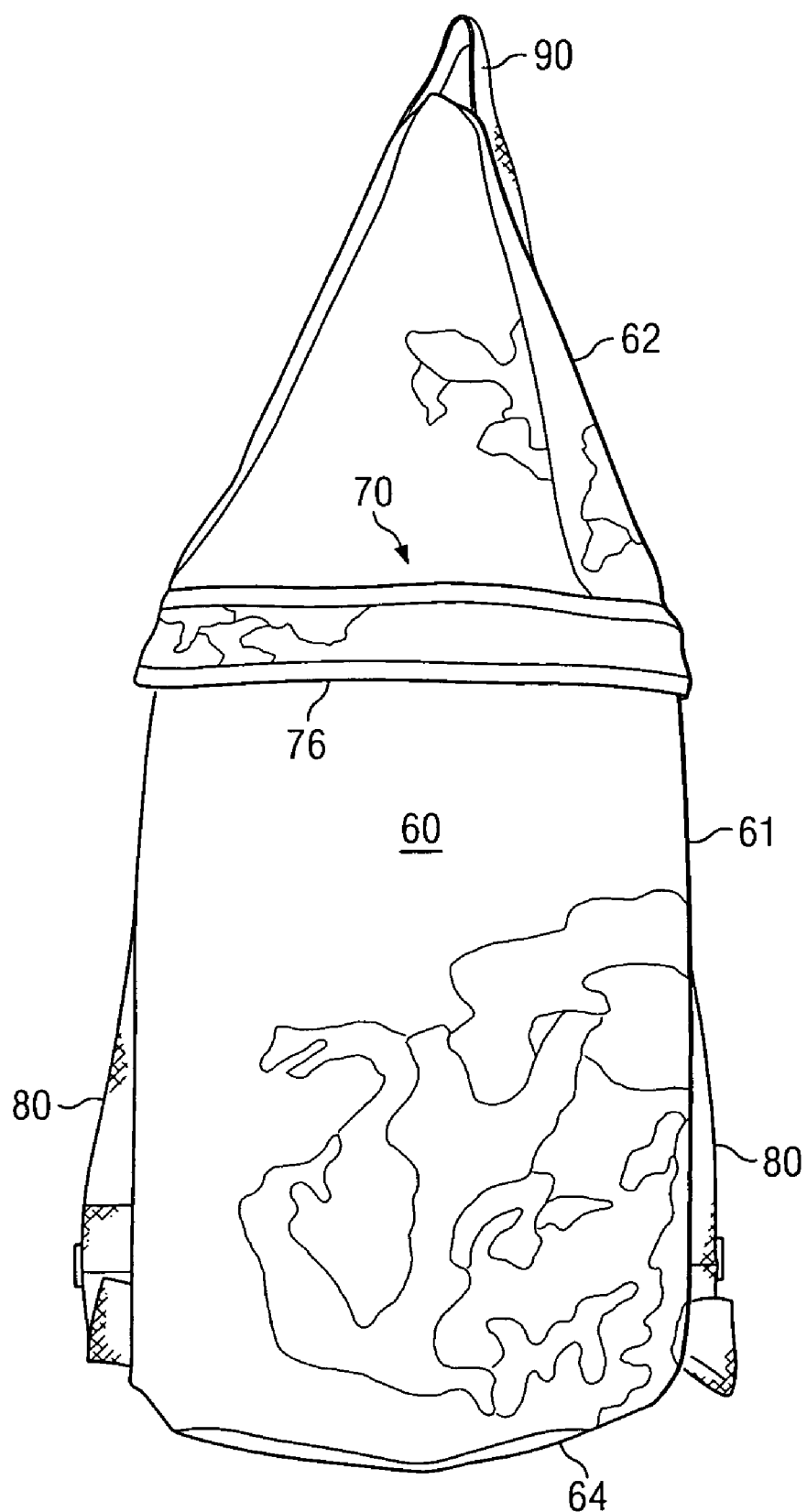
FIG. 3 is a front perspective view of an exemplary container.

FIG. 3 shows, in a more detailed view, a configuration of the container 60 that can be utilized with the game feeder 50 in an exemplary configuration of the invention. The container 60 of FIG. 3 includes a body 61, a top end 62, a bottom end 64, an access area 70, straps 80 and a loop 90. The top end 62, in the configuration of FIG. 3, is conically shaped, advantageously reducing the likelihood that nuisance animals (e.g., raccoons, squirrels, or the like) will jump on the top end 62 of the container 60 and attempt to take feed from the container 60. The conical shape additionally facilitates the runoff of environmental elements such as rain, dirt, snow, and the like from the container 60, thereby preventing accumulation of such environmental elements on the top of the container 60. While such a specific shape for the top end 62 is shown in the configuration of FIG. 3, it should be understood that in other embodiments of the invention the top end 62 can have other shapes—including, but not limited to, those that facilitate one or both of the dual features described above and those that do not. For example, in some configurations, the top end 62 can have a pyramidal shape, a shape of a frustrum of a pyramid, a shape of a frustrum of a cone, or a hemispherical shape. In yet other configurations, the top end 62 can be flat or substantially flat.

The bottom end 64 and body 61 are generally arranged and designed to support feed or the like. While the bottom end 64 and body 61 together generally form what appears as a tubular shape, it should be understood that other shapes can be utilized, including but not limited to, squares, triangles and the like. More details of the bottom end 64 and the body 61 will be described below.

The container 60 can be a variety of different sizes—both large and small, being designed to support a variety of different loads. In some configurations, the size/load of the container 60 can be small enough to mount to the back of an individual—e.g., allowing an individual to travel to a specific location with a filled container 60. In other configurations, the size/load of the container 60 can be large enough to require two or more individuals and/or a machine to handle a filled container 60. With this general description, it can be seen that the container 60 can have a wearability feature (e.g., via utilization of the straps 80 like a backpack)—such a wearability feature advantageously facilitating the transportation of a filled container 60 to its ultimate location.

The material utilized in the container 60 can be virtually any material; however, in a preferred embodiment, the container 60 is made of material or materials that facilitate collapsibility. In such embodiments, the material(s) can have inherent characteristics of flexibility; alternatively, the material can be rigid with flexible components interspersed therebetween. As an example of the latter, intended for illustrative purposes only, the material can be a rigid metallic or plastic material that is interspersed with hinges, joints, members or the like that allow an accordion or bellow-like folding. As an example of the former, the flexible material can include any of a variety of synthetic or natural materials, including, but not limited to, plastics, yarns, and the like. In some configurations, the material can be made of two or more similar or dissimilar materials joined together—for example, via sonic welding, weaving, or the like.

In a preferred embodiment, the material is additionally weatherproof and/or fireproof, and one which would maintain the freshness or desirability of the feed for an extended period of time. Such characteristics can either be naturally inherent within the material or be applied via treatment of the material with an appropriate chemical and/or process. Such chemical treatments and/or processes would be known or understood by one of ordinary skill in the art.

One preferred material is an 18-gauge vinyl. Other materials will become apparent to one of ordinary skill in the art, including materials with varying denier. To a certain degree, the type of material utilized in the container will be dependent on the type of feed or the like being supported and the size of the container 60—both collectively contributing to a determination of the support load. Other desirable characteristics of the material are those that can be readily printed or created with a desired color, design or pattern. As can be seen in the configuration of FIG. 3, the material can include a camouflaged pattern. Other patterns, including other camouflaged patterns, may be used, which would be understood by one of ordinary skill in the art.

The access area 70 in the configuration of FIG. 3 includes a flap 76. Additionally shown are the straps 80 and the loop 90. The details of the access area 70, flap 76, straps 80, and loop 90 will be described below with reference to FIGS. 8 and 9.

Figure 4:
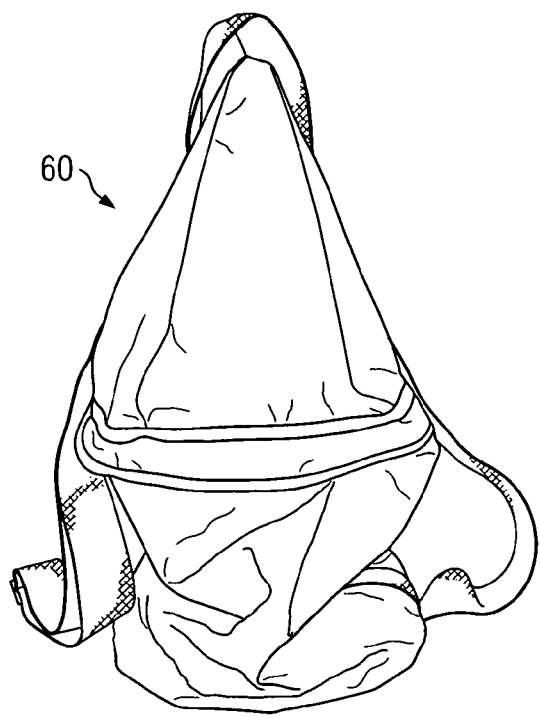
FIGS. 4-6 are illustrative views of collapsibility states of the container, according to an embodiment of the invention.
Figure 5:
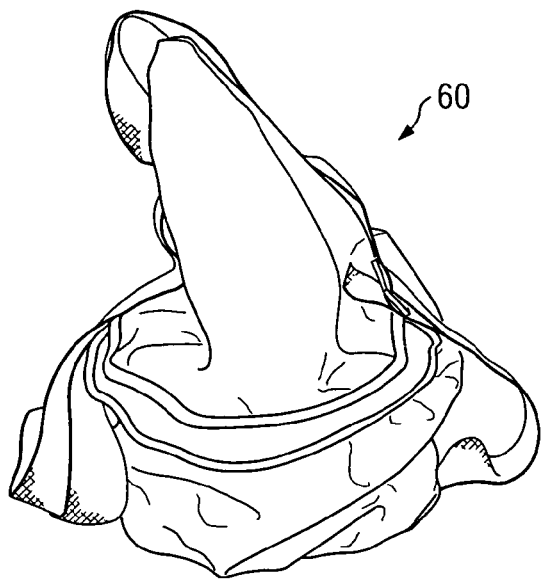
Figure 6:
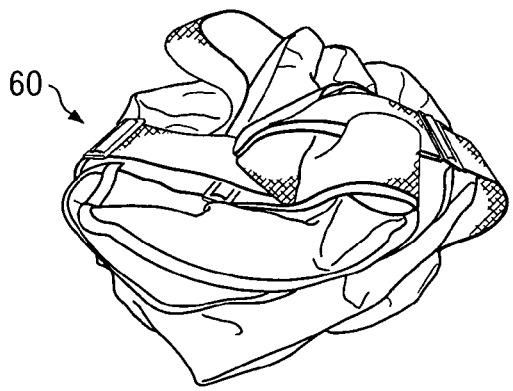

FIGS. 4-6 are an illustration of various views showing collapsibility states of the container 60, according to an embodiment of the invention. The container 60 starts in an expanded state (e.g., FIG. 3) and can ultimately be reduced to a collapsed state of FIG. 6. As described above, this collapsibility can be enabled either via an inherent flexibility within the material, through an interspersion of flexible materials between rigid materials or through other means known by one of ordinary skill in the art.

With such a collapsibility of the container 60, several advantages can be seen. In a collapsed state, the container 60 can be stored in a small area, not taking up much room—something that is a desirable feature in limited shelf space at a retail store or in the storage of a warehouse, garage, or the like. Additionally, the collapsed state allows for ease of transport (e.g., via mail for containers 60 that are mailed or in transport after a container 60 has been emptied—the latter of these being described in more detail below in a discussion of a use of the container 60).

Figure 7:
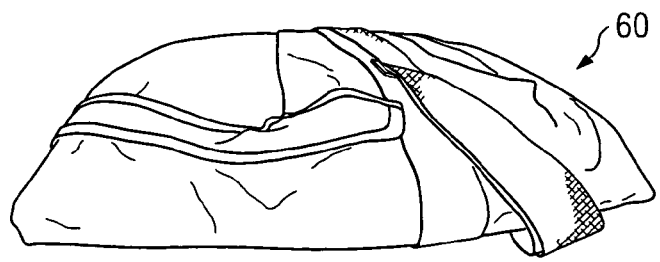
FIG. 7 is an illustrative view of the foldability of a container, according to an exemplary configuration of the invention.

FIG. 7 is an illustration of a foldability of the container 60. FIG. 7 is intended to illustrate that the container 60 can be transformed from an expanded state to a collapsed or folded state in a variety of manners. For example, in other configurations, the container 60 can have a bellow-like configuration transforming the container 60 from an expanded state to a collapsed or folded state. In yet further configurations, the container 60 can be rolled into a collapsed state.

Figure 8:
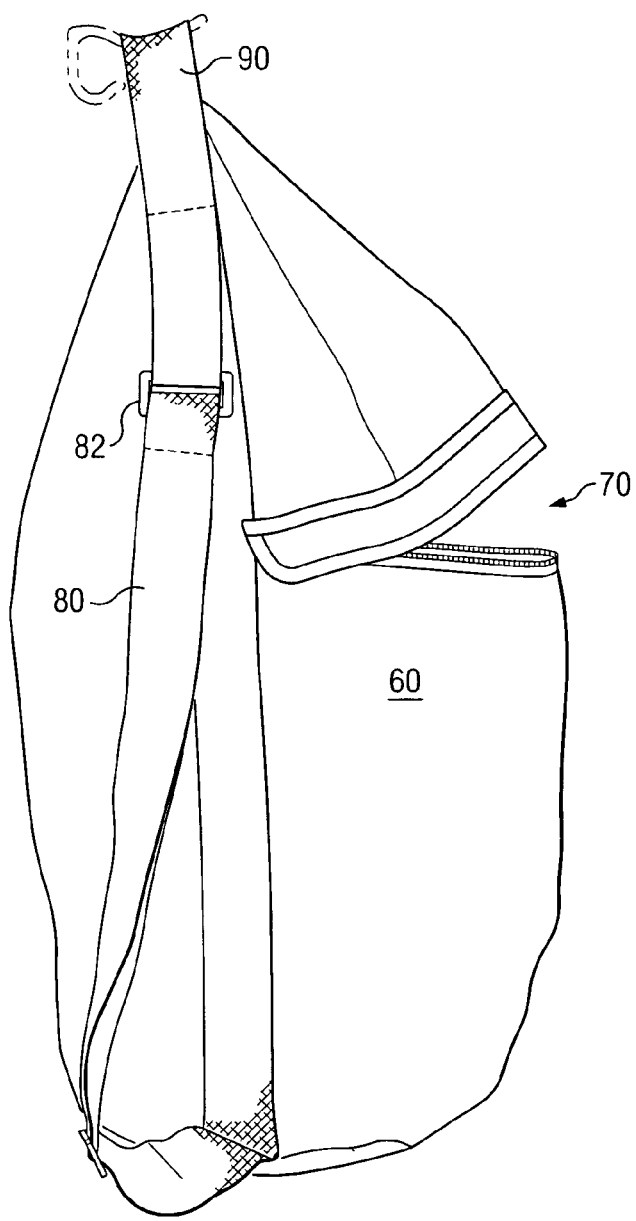
FIG. 8 is a side perspective view of an open container, showing straps attached thereto.

FIG. 8 is a side perspective view of the container 60 that can be utilized with the game feeder 50. The container 60 is shown with an access area 70 that has been opened. The access area 70 is generally operable to allow feed or the like to be placed within the container 60. Preferably, the access area 70 is capable of being substantially closed or sealed. In the configuration of FIG. 8, the closing of the access area 70 is via zipping—described in more detail with reference to FIG. 9.

Additionally shown in FIG. 8 are straps 80 (only one strap 80 seen from this view) and a loop 90, shown hanging from a hook. The straps 80 and the loop 90 can be utilized to carry the container 60. For example, the straps 80 can be placed around an individual's shoulder allowing the container 60 to be mounted to an individual's back. To facilitate such a placement, the straps 80 include adjustment buckles 82 that allow adjustment of a length of the straps 80. Preferably, the straps 80 are non-obtrusive and include a pattern that is similar to the remaining portion of the container 60—e.g., camouflage pattern, other pattern, or the like. As described above, the straps 80 can allow a wearability feature, advantageously allowing an individual to transport a filled container 60 to a desired installation location, such as in a wooded area.

Figure 16:
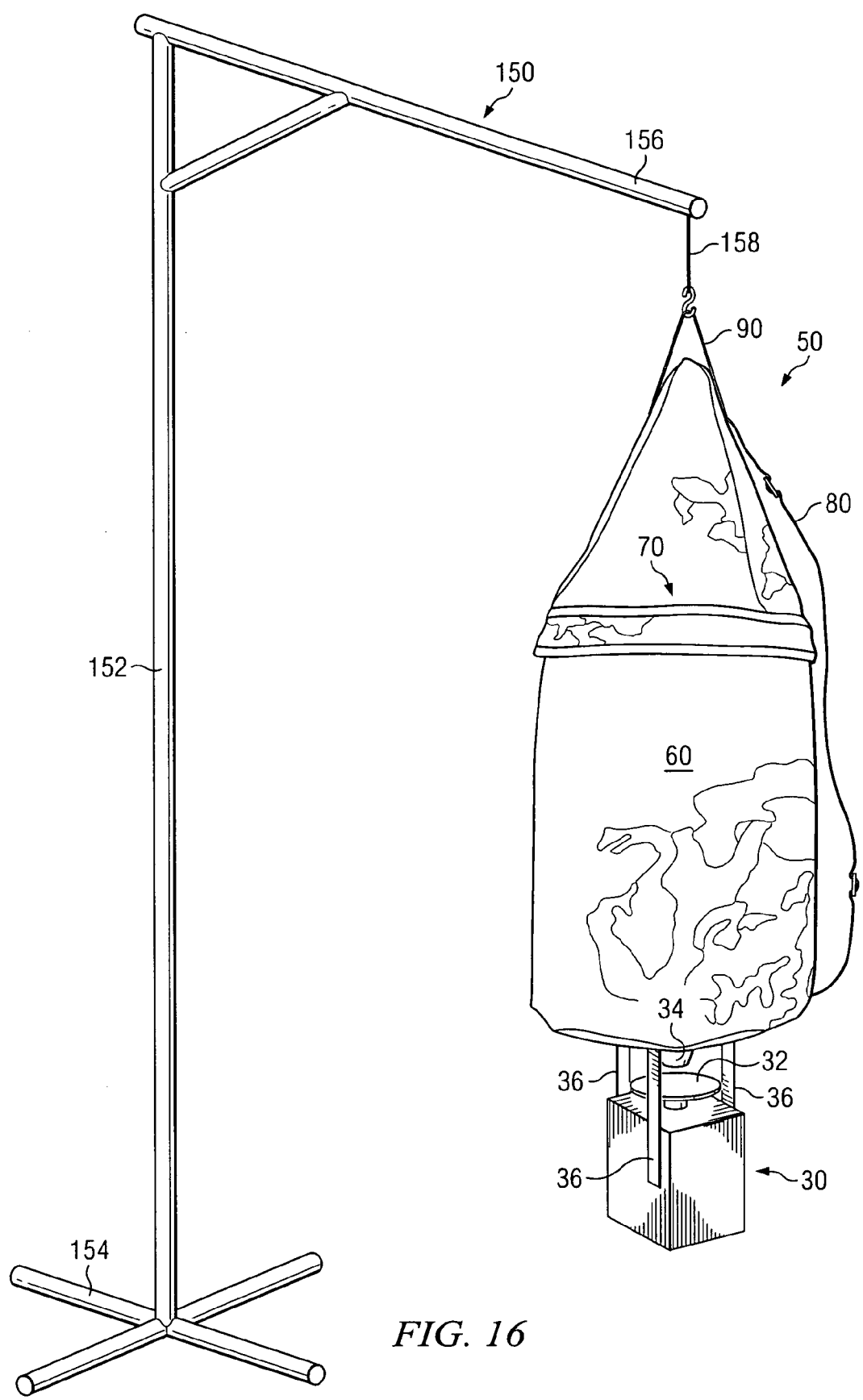
FIG. 16 is a perspective view of one embodiment of the game feeder mounted or hanging from an embodiment of a feeder stand.

The loop 90 can additionally be utilized to suspend the container 60 therefrom—e.g., hooking the loop 90 around a tree branch, feeder stand, such as the feeder stand 150 of FIG. 16, or the like and suspending the container 60 therefrom. While the straps 80 and the loop 90 of FIG. 8 have been shown in one configuration, it should be understood that in other configurations, other straps 80 and/or loops 90 can be utilized—said straps 80 and/or loops 90 being placed in other locations.

Figure 9:
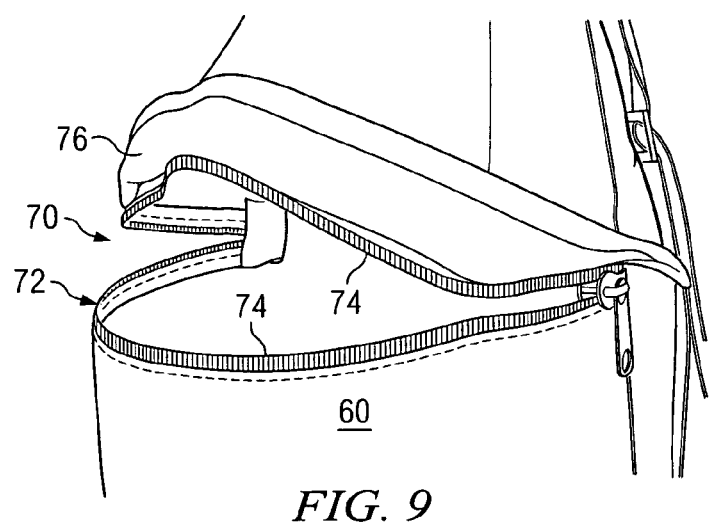
FIG. 9 is a side perspective view of an open container, showing a close-up view of an access area.

FIG. 9 is a close-up perspective view of the access area 70 of FIG. 8. The flap 76 of the access area 70 has been flipped up to reveal the zipper 72 and zipper threads 74. The flap 76 is operable to protect the zipper 72 and zipper threads 74. Other similar devices can be utilized, as should become apparent to one of ordinary skill in the art, including, but not limited to, snaps, hook-and-loop fasteners, laces, and the like.

Figure 10:
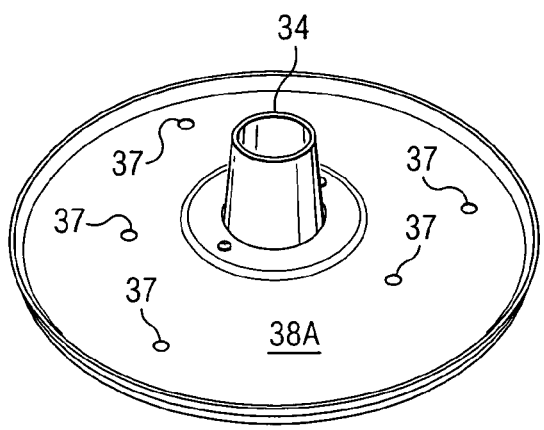
FIG. 10 is a perspective view of a bottom plate.
Figure 11:
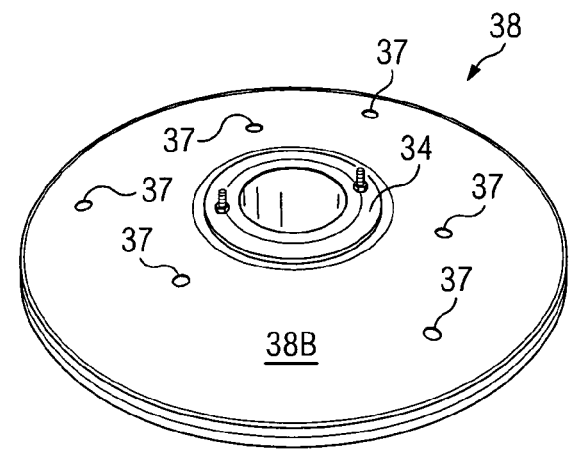
FIG. 11 is a perspective view of the bottom plate of FIG. 10, flipped upside down.

FIGS. 10 and 11 show a perspective view of a bottom plate 38 that can be utilized in accordance with an embodiment of the invention. FIG. 10 shows a bottom side 38A of the bottom plate 38 while FIG. 11 shows a top side 38B of the bottom plate 38. The bottom plate 38 of FIGS. 10 and 11 has a feeder funnel 34 coupled thereto. Such a coupling can be accomplished using any of a variety of coupling techniques that should become apparent to one of ordinary skill in the art. For example, as shown in FIGS. 10 and 11, the feeder funnel 34 is coupled to the bottom plate 38 via nuts and bolts. Disposed within the bottom plate 38 are holes 37. The holes 37 are arranged and designed to coordinate with a mounting of support brackets 36 (shown in FIG. 2)—the support brackets 36 suspending the remaining portion of the dispensing device 30. As any one of a large number of dispensing devices 30 can be utilized, the bottom plate 38 can be configured with several different holes 37, allowing utilization of any of the number of different dispensing devices.

Figure 12:
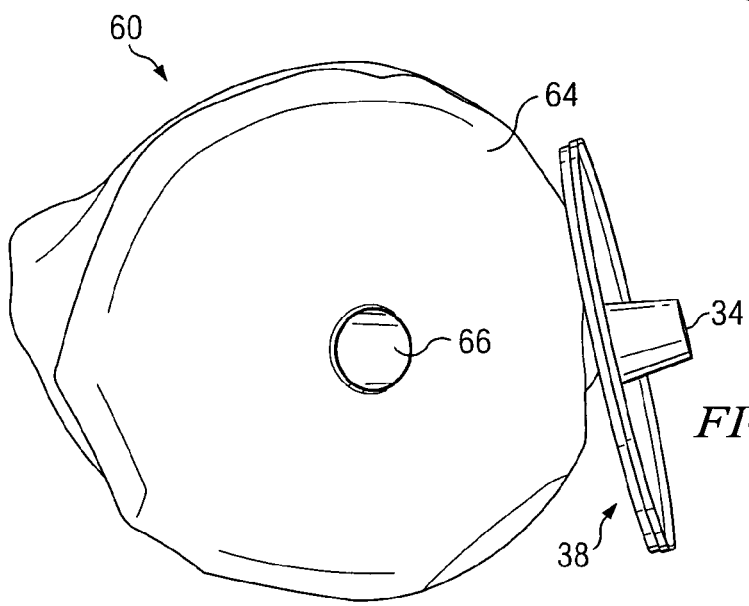
FIG. 12 is a perspective view of a bottom end of a container, showing a dispenser hole and the bottom plate.

FIG. 12 is a view of a bottom end 64 of the container 60. The bottom end 64 of the container 60 has a dispenser hole 66 therein. The bottom plate 38 and feeder funnel 34 of FIGS. 10 and 11 are shown beside the bottom end 64 of the container 60, showing a size relationship between the bottom end 64 of the container 60 and the bottom plate 38. Other configurations and size relationships can be utilized as will become apparent to one of ordinary skill in the art.

Figure 13:
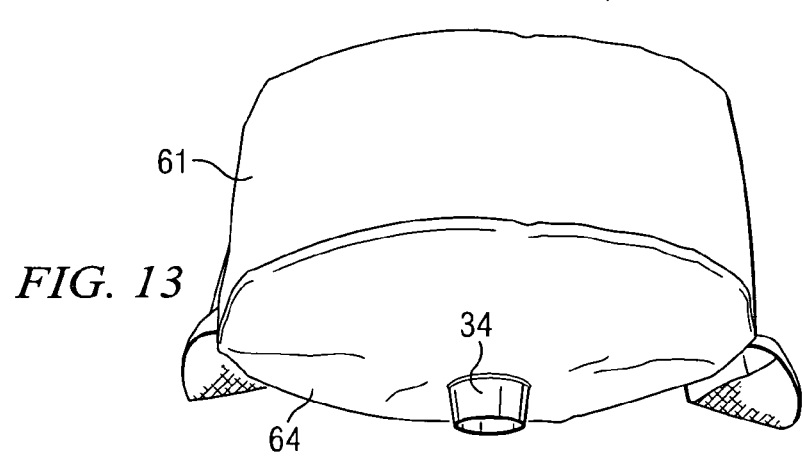
FIG. 13 is a perspective view of a bottom end of a container, showing a feeder funnel mounted within a dispenser hole.

FIG. 13 is a close-up perspective view of the bottom end 64 of the container 60. Shown extending through a dispenser hole 66 in the bottom end 64 is the feeder funnel 34 of FIGS. 10, 11, and 12 which, as described above, can be connected to the bottom plate 38. As described above, the bottom end 64 is generally arranged and designed to coordinate with the body 61 of the container 60 to support the feed. As the bottom plate 38 is positioned within the container 60 and against the bottom end 64 of the container 60, the feed rests upon the top side 38B of the bottom plate 38.

With reference to FIGS. 10-13, it should be expressly understood that while a bottom plate 38 and feeder funnel 34 have been shown and described with reference to one embodiment of the invention, in other embodiments, the bottom plate 38 and the feeder funnel 34 may not be utilized, or they may be utilized as part of the dispensing device 30. For example, the dispersion of feed or the like may be accomplished via a specific configuration utilized with the dispenser hole 66—e.g., the material utilized for the container 60 and/or other material (e.g., metal, plastic, cloth, or the like) can be utilized to form an integral funnel extending from the dispenser hole 66. Additionally, the mounting of a dispensing device 30 may occur directly with the bottom end 64 of the container 60—e.g., the bottom end 64 can include a variety of hooks or the like for supporting a dispensing device 30. Furthermore, the container 60 and/or bottom end 64 can be adapted to facilitate other types of dispensing devices—including not only those that are now known, but also those that are later developed.

Figure 14:
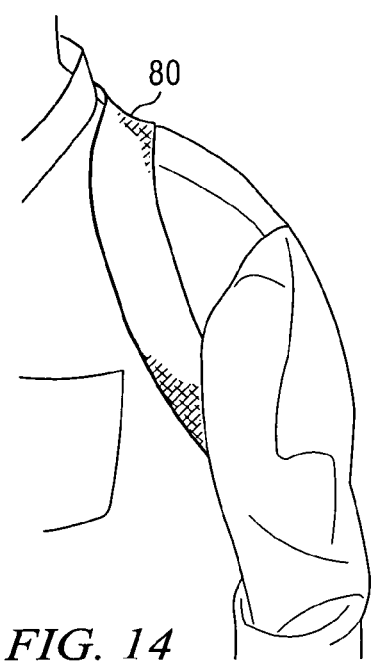
FIG. 14 shows straps of a game feeder container wrapped around an individual's shoulder.
Figure 15:
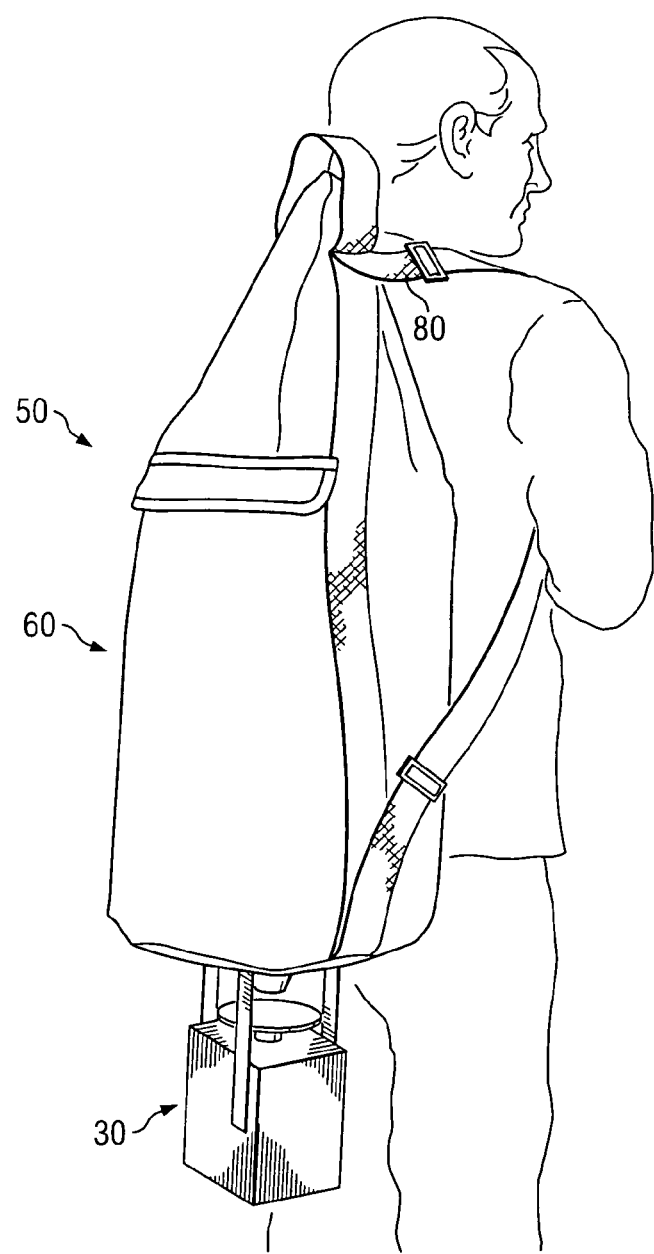
FIG. 15 shows a game feeder container mounted on an individual's back with a dispensing device mounted thereto.

FIGS. 14 and 15 illustrate the utilization of straps 80 on the container 60. For example, a strap 80 can be placed over a shoulder (FIG. 14) and the container 60 can be mounted on an individual's back (FIG. 15). With such a configuration, the container 60 is easily portable. Also shown, once again, is the mounting of a dispensing device 30 to the bottom end 64 of a container 60 to form a game feeder 50.

In operation, an individual (e.g., a hunter) can fill the container 60 with feed or the like by unzipping the access area 70 (FIG. 9) and inserting feed or the like. The individual can travel to the desired location of placement of the game feeder 50 via utilization of a vehicle and/or walking. With either forms of travel, the straps 80 and/or loops 90 can be utilized to facilitate the transport. As to the former form of transportation, the individual can utilize the straps 80 to help move the filled container 60 around—e.g., to load or unload the filled container 60 on the back of a truck, trailer, or four wheeler. As to the latter form of transportation, the straps 80 can be placed around an individual's shoulders and the container 60 can be mounted to an individual's back. Upon arrival at the desired location, the container 60 can then be hung from a tree—e.g., using the loop 90—or mounted on top of a tripod or other similar device. Other techniques utilized in placing such a game feeder 50 in a desired location would be known or understood by one of ordinary skill in the art. Placement of the dispensing device 30 on the lowermost end of the container 60 can occur at a variety of different times, dependent on the type of dispensing device 30 utilized and/or the preference of the user. When the container 60 is empty (e.g., hours, days, weeks later), the individual can come back and simply collapse the container 60 down to transport to another location or simply bring feed to the location to conveniently refill the container 60 and rehang the feeder 50.

Other methods involving the present invention may include transporting and using a collapsible game feeder that includes providing a collapsible game feeder that includes: (i) a collapsible container operable to receive and store feed, and to release feed external the collapsible container, and (ii) a dispensing device operable to receive the feed from the collapsible container, and to dispense the feed external the collapsible game feeder; and transporting the collapsible game feeder to a desired location with the collapsible container in a collapsed state; and using the collapsible game feeder at the desired location by filling the collapsible container with feed. Using the collapsible game feeder may further include dispensing the feed at the dispensing device by receiving feed from the collapsible container and dispensing the feed external the collapsible game feeder using the dispensing device. The method may also include transporting the filled collapsible game feeder to a selected hunting location, and wherein using the collapsible game feeder further includes dispensing the feed at the selected hunting location by receiving feed from the collapsible container and dispensing the feed external the collapsible game feeder using the dispensing device.

FIG. 16 is a perspective view of one embodiment of the collapsible game feeder 50 mounted or hanging from an embodiment of a feeder stand 150 using the loop 90 and a rope 158, which may be used, in this embodiment, to hoist the collapsible game feeder 50 to its desired height in the air. The collapsible game feeder 50 will not be described again here in detail since this embodiment has been described previously.

The feeder stand 150 will preferably be constructed of light-weight material, such as thin metal or plastic, and will be capable of being easily disassembled and assembled for ease of transporting. The feeder stand 150 may include a base 154, a support member 152, and an arm 156. A variety of other arrangements and configurations of the feeder stand 150 would be apparent to one of ordinary skill in the art.

Thus, it is apparent that there has been provided, in accordance with the present invention, a game feeder and corresponding methods of using the same that satisfy one or more of the advantages set forth above. Although the preferred embodiment has been described in detail, it should be understood that various changes, substitutions, and alterations can be made herein without departing from the scope of the present invention, even if all of the advantages and benefits identified above are not present. For example, the various elements or components may be combined or integrated in another system or certain features may not be implemented. Also, the techniques, systems, sub-systems, and methods described and illustrated in the preferred embodiment as discrete or separate may be combined or integrated with other systems, techniques, or methods without departing from the scope of the present invention. For example, the container 60 can include an integrally mounted feeder funnel 34 and may or may not include a bottom plate. Other examples of changes, substitutions, and alterations are readily ascertainable by one skilled in the art and could be made without departing from the spirit and scope of the present invention.

What is claimed is:

1. A collapsible game feeder for automatically dispensing feed, the collapsible game feeder comprising:
    a collapsible container operable to receive, store and release feed, the collapsible container includes:
        a body,
        a top end,
        a means for carrying the collapsible container,
        an access area operable to receive feed into the collapsible container, and
        a bottom end having an area, an inside surface, an outside surface, and an external edge, the bottom end having a dispensing hole formed therein and extending from the inside surface to the outside surface that is operable to release feed stored from within the collapsible container;
    a bottom plate positioned adjacent at least a portion of the area of the inside surface of the bottom end, the bottom plate provides rigidity across the bottom end, the bottom plate having an opening positioned adjacent the dispensing hole of the bottom end and the bottom plate having at least one coupling portion;
    a feeder funnel that forms an opening and that is at least semi-rigid, the feeder funnel having a first end and a second end extending below the bottom plate and the bottom end of the collapsible container, and coupled to the bottom plate at the first end adjacent the opening in the bottom plate and the dispensing hole of the bottom end of the collapsible container so that feed that is positioned within the collapsible container near the opening of the bottom plate is released from within the collapsible container through the opening of the feeder funnel via a gravity feed;
    an automatic dispensing device positioned a distance below the second end of the feeder funnel and below the bottom end of the collapsible container and operable to receive feed released from the collapsible container through the feeder funnel, and to dispense feed away from and external the collapsible game container; and a support bracket that couples the automatic dispensing device to the at least one coupling portion of the bottom plate through the collapsible container.

2. The collapsible game feeder of claim 1, wherein the access area of the collapsible container is a zipper.

3. The collapsible game feeder of claim 2, wherein the access area of the collapsible container is positioned on the body of the collapsible container.

4. The collapsible game feeder of claim 2, wherein the access area of the collapsible container is positioned on the top end of the collapsible container.

5. The collapsible game feeder of claim 1, wherein the top end of the collapsible container is conical shaped.

6. The collapsible game feeder of claim 1, wherein the top end of the collapsible container is hemispherical shaped.

7. The collapsible game feeder of claim 1, further comprising:
   a loop coupled to the top end of the collapsible container and operable to hang and support the collapsible game feeder from a desired object while the collapsible container contains feed.

8. The collapsible game feeder of claim 7, further comprising:
   a stand operable to support the collapsible game feeder through the loop of the collapsible container when the collapsible container contains feed.

9. The collapsible game feeder of claim 1, further comprising:
   a camouflage pattern positioned on an exterior of the collapsible container.

10. The collapsible game feeder of claim 9, wherein the collapsible container is made of plastic.

11. A collapsible game feeder for automatically dispensing feed, the collapsible game feeder comprising:
   a collapsible container operable to store and release feed, the collapsible container including:
     a body,
     a top end,
     a bottom end having an area, an inside surface, an outside surface, and an external edge, the bottom end having a dispensing hole formed therein and extending from the inside surface to the outside surface that is operable to release feed stored from within the collapsible container,
     an access area that includes a zipper and is operable to receive feed into the collapsible container;
     a means for carrying the collapsible container, and
     a loop, wherein the collapsible container can transition between an expanded state and a collapsed state;

a bottom plate positioned adjacent at least a portion of the area of the inside surface of the bottom end, the bottom plate provides rigidity across the bottom end, the bottom plate having an opening positioned adjacent the dispensing hole of the bottom end; and the bottom plate having at least one coupling portion a feeder funnel that forms an opening and that is at least semi-rigid, the feeder funnel having a first end and a second end extending below the bottom plate and the bottom end of the collapsible container, and coupled to the bottom plate at the first end adjacent the opening in the bottom plate and the dispensing hole of the bottom end of the collapsible container so that feed that is positioned within the collapsible container near the opening of the bottom plate is released from within the collapsible container through the opening of the feeder funnel via a gravity feed;

an automatic dispensing device that includes a spinner plate positioned a distance below the second end of the feeder funnel and below the bottom end of the collapsible container and operable to receive feed released from the collapsible container through the feeder funnel, and to dispense feed away from and external to the collapsible container;

and a support bracket that couples the automatic dispensing device to the at least one coupling portion of the bottom plate through the collapsible container.

12. The collapsible game feeder of claim 1, wherein the means for carrying the collapsible container includes a strap coupled to the collapsible container and operable to allow a user to carry the collapsible game feeder.

13. The collapsible game feeder of claim 12, wherein the strap is removable from the collapsible container.

14. The collapsible game feeder of claim 1, wherein the means for carrying the collapsible container includes a loop coupled to the top end of the collapsible container and operable to hang and support the collapsible game feeder from a desired object while the collapsible container is full of feed.

15. The collapsible game feeder of claim 1, wherein the feeder funnel is rigid.

16. The collapsible game feeder of claim 11, wherein the feeder funnel and the bottom plate are formed as one piece.

17. The collapsible game feeder of claim 1, wherein the feeder funnel is integrally coupled to the bottom plate.

* * * * *